Patented Feb. 22, 1944

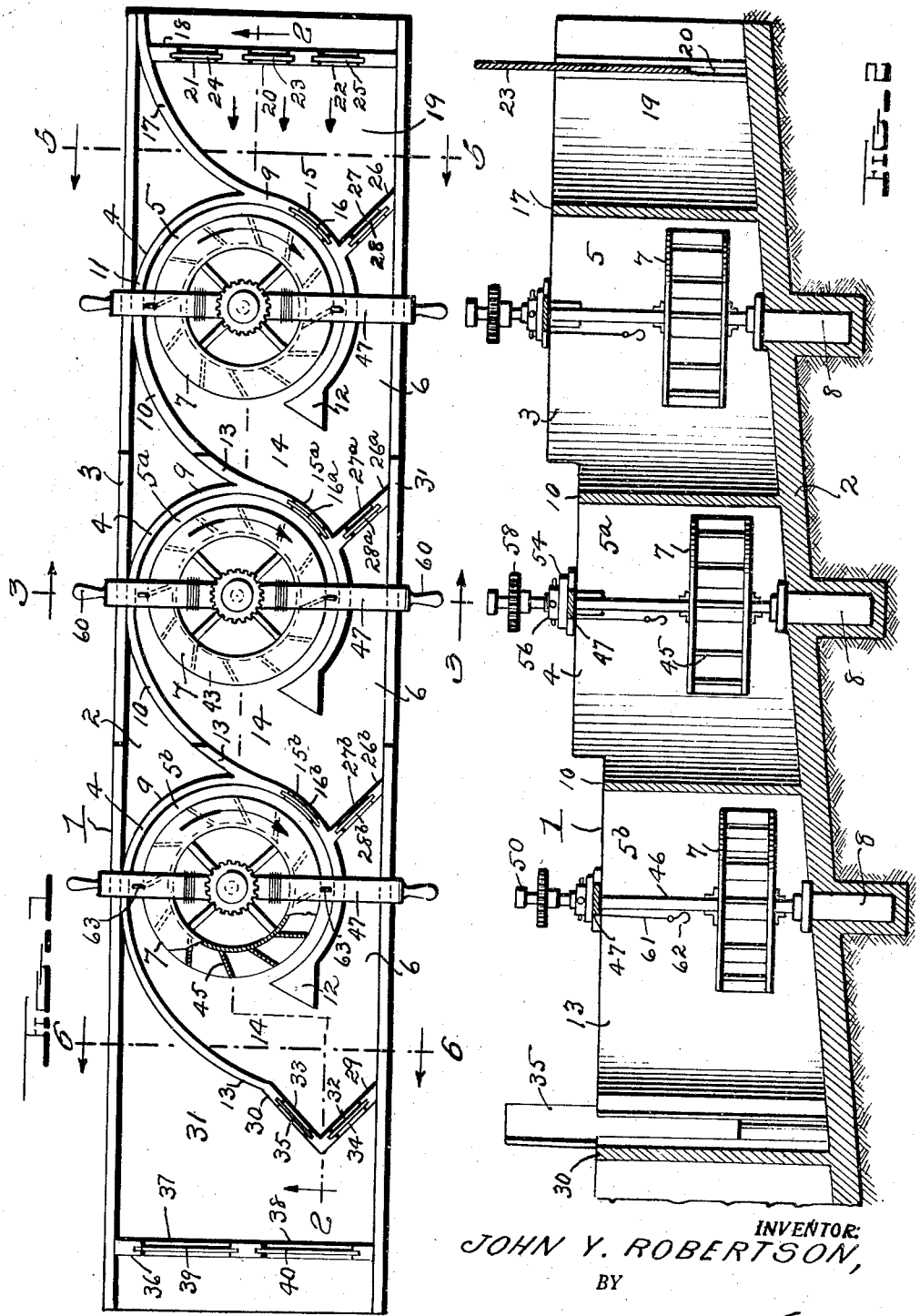

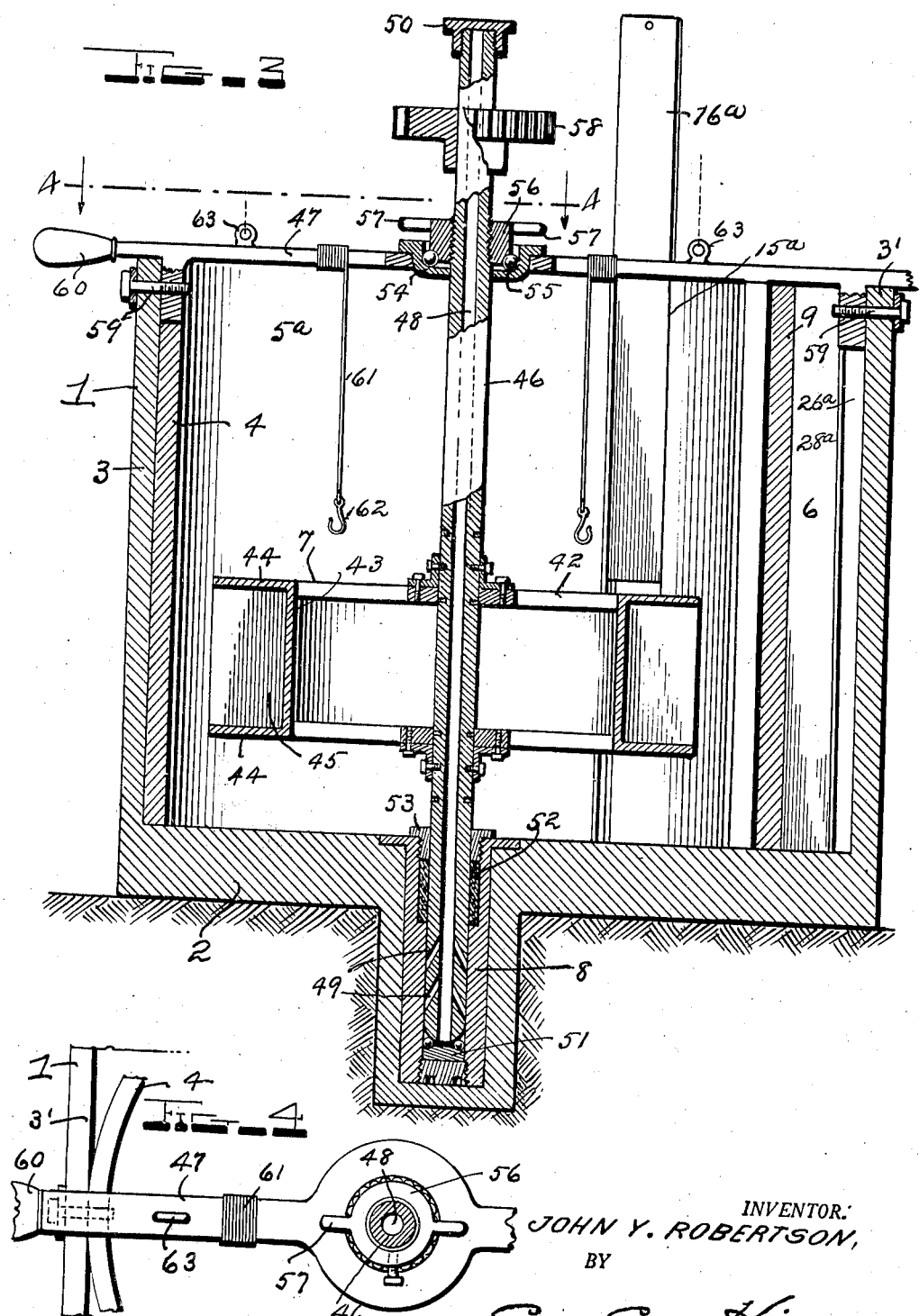

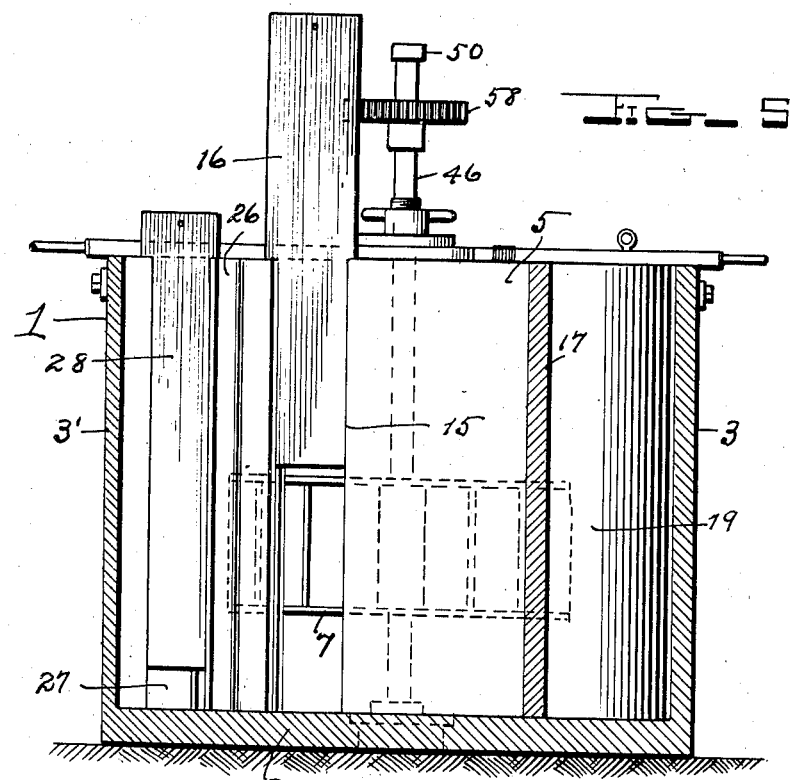
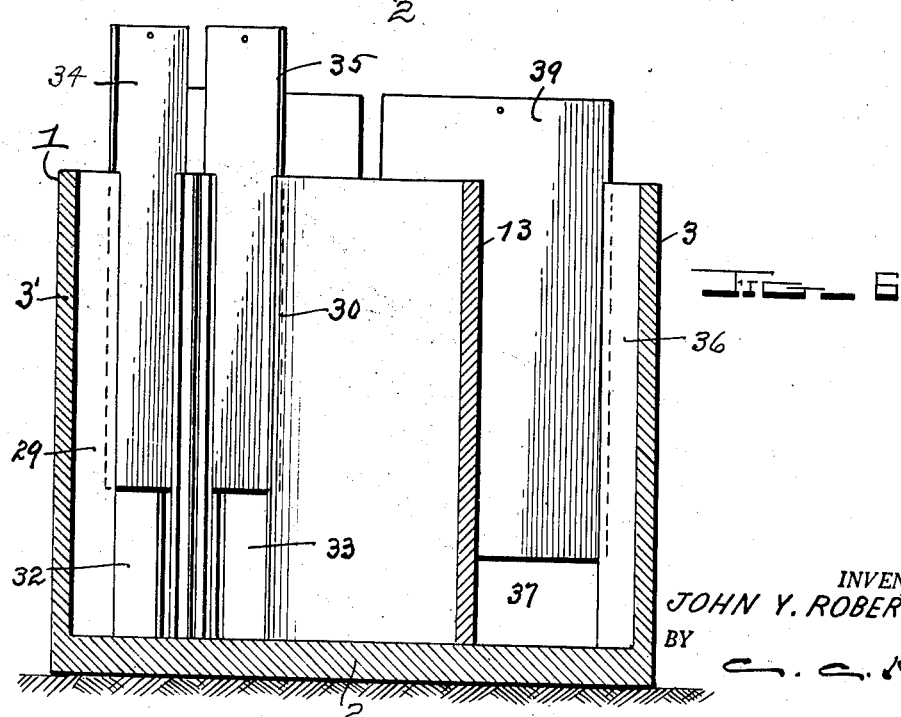

2,342,223

UNITED STATES PATENT OFFICE 2,342,223

WATER POWER SYSTEM

John Y. Robertson, El Paso, Tex.

Application June 28, 1943, Serial No. 492,619

7 Claims. (Cl. 60—102)

This invention relates to a water power system for utilizing the flow of water for transmitting power to drive any desired kind of apparatus or machinery.

One object of the invention is to provide a water power system which is of inexpensive type and may be installed and operated at low cost.

Another object of the invention is to provide a water power system which may be readily installed for use regardless of the topography of the ground and which may be used to develop power for practical uses from low, high or intermediate water power sources.

Still another object of the invention is to provide a water power system in which the amount of power desired or required for use may be regulated as required in a ready and efficient manner, and which may be adjusted for easy running and manipulated for repairs and replacement of parts at the expenditure of a minimum amount of time and labor.

The invention consists of the novel features of construction, combination and arrangement of parts hereinafter fully described and claimed, and as shown in the accompanying drawings, in which:

Fig. 1 is a top plan view of a water power system embodying my invention and showing the use of a number of water power wheels.

Fig. 2 is a longitudinal section of the same taken on line 2—2 of Fig. 1.

Fig. 3 is a vertical transverse section on an enlarged scale taken, for example, on line 3—3 of Fig. 1 through the flume, one of the water wheel chambers and the wheel therein, and showing particularly the wheel mounting.

Fig. 4 is a fragmentary sectional plan view taken on line 4—4 of Fig. 3.

Figs. 5 and 6 are vertical transverse sections on an enlarged scale, taken, respectively, on the lines 5—5 and 6—6 of Fig. 1.

Referring now more particularly to the drawings, 1 designates a flume which may be either curved or straight or embody both curved and straight portions, and which may be of suitable width and depth and constructed of concrete, metal, wood or any desired combination of these materials. This flume comprises in general a bottom wall 2, side walls 3, 3' and partitions 4, the last-named forming a desired number of turbine or water wheel chambers or compartments 5, 5ª, 5ᵇ and a raceway 6 common to all of said chambers or compartments. Three such chambers or compartments are shown in the present instance, in each of which is arranged a horizontally rotatable turbine or water wheel 7 of a novel construction and mounting hereinafter more fully described, but it is to be understood that any length of flume and number of chambers or compartments and water wheels arranged in succession therein may be employed according to working conditions and the amount of power to be developed and transmitted for use. The chambers are arranged in alinement mainly on one side of the longitudinal center of the flume and their outer sides join the side wall 3 of the flume, while the raceway 6 is arranged between the inner sides of the chambers and opposite side wall 3' of the flume. From the head end to the tail end of the flume the flume and chambers are formed so as to dispose the chambers and their flume portions in stepped relation, each at a desired lower level from the one preceding it, so that the chambers and flume slope at a required angle to give a desired head flow or velocity to the water supplemental to any normal head flow which it may have. Each chamber 5, 5ª, 5ᵇ is provided with a central depending bearing sump or well 8 which extends downward through the bottom wall 2.

The forming partition 4 of each chamber 5, 5ª, 5ᵇ comprises a main chamber forming wall portion 9 and a deflector forming wall portion 10. The wall portion 9 is concentric with the bearing sump and axis of the wheel 7 and extends through an arc of about 250 degrees from one end 11 thereof adjoining the flume wall 3 about the sides and head portion of the chamber and terminates at its opposite end 12 at the discharge side of the chamber between the longitudinal center of the flume and the raceway 6, while the wall portion 10 extends on a curved line from the first-named end 11 of the wall portion 9 adjoining the wall 3 outwardly and rearwardly away from the discharge side of the wheel and toward the flume wall 3' at a tangent to the wheel and eccentric to its axis and terminates at its free end 13 beyond the free end 12 of the wall portion 9. A flaring discharge passage 14 is thus formed at the rear of the chamber which opens between the wall ends 12 and 13 into the raceway 6 and the wall 10 thus serves to deflect the spent water from the wheel rearwardly and at an angle to the circumference of the wheel toward the raceway and in a direction toward the tail end of the flume.

In the head portions of chamber walls 9 of the respective chambers are formed water inlet passages 15, 15ª, 15ᵇ controlled by vertically sliding gates 16, 16ª, 16ᵇ. Each of these passages is located in its chamber wall at one side of the longitudinal center of the flume and between the same and the raceway 6. Arranged at the head of the flume are partitions 17 and 18. The partition 17 extends on a curved line from the wall 3 to the wall 9 of the first wheel chamber 5 of the series and connects therewith about in line with the longitudinal center of the flume, while the partition 18 extends across the flume from side to side thereof to form a forebay or penstock 19 to which water is admitted from the source for flow to the water wheel. In the partition 18 are provided central and side passages 20, 21 and 22, controlled, respectively, by vertically sliding gates 23, 24 and 25, whereby a greater or less volume of water may be admitted from the source to the forebay 19 for passage to the water wheel chambers or raceway or both.

Arranged in the raceway 6 are partitions 26, 26$^a$, 26$^b$ having passageways 27, 27$^a$, 27$^b$ formed therein and a vertically sliding gate 28, 28$^a$, 28$^b$ for controlling said passageways. Each of these partitions extends at an inward and rearward angle from the wall 3' to the wall 9 of the adjacent chamber and connects with the latter between the passageway 15 of said chamber and the raceway 6. A similar partition 29 is disposed in the raceway beyond the last chamber 5$^b$ of the series and between the same and the tail end of the flume. This partition 29 is joined to the end 13 of the wall 10 of the wheel chamber 5$^b$ of the series by a partition 30 arranged at right angles thereto, the two forming a V-shaped partition between said wheel chamber and a tailbay or tailstock 31 in which water may be confined until its final discharge from the flume. In these partitions 29 and 30 are passageways 32 and 33 controlled by vertically sliding gates 34 and 35. A partition 36 extends across the flume to control the discharge of the water from the bay 31. This may be provided with any desired number of outlet passages and control gates therefor. In the present instance two such passages 37 and 38 are shown controlled by gates 39 and 40.

The above described partitions and passages with their controlling gates provide for a novel flow control of the water to regulate the amount of water supplied to each wheel or to two or more wheels of the series as well as the flow of water through the raceway, as hereinafter fully described.

The water wheels or turbines 7 employed may be of any suitable construction, but as shown each is of wheel type and comprises a central hub or sleeve 41, spokes or arms 42 radiating therefrom, and a rim band 43 carried by the spokes or arms, said band being provided with upper and lower circular flanges 44 forming therewith a channeled rim in which are inclosed vanes or buckets 45 of either fixed or adjustable type, as desired. The hub or sleeve 41 is fixed to or adjustably mounted on a shaft 46 stepped and journaled at its lower end in the bearing sump 8 and journaled at its upper end in and supported by a crossbar or beam 47. The shaft 46 is hollow to provide a passage 48 for the reception and flow of lubricant through ducts 49 to the bearing surfaces in the sump. A threaded cap 50 may be provided at the upper end of the shaft to close and prevent entrance of dust and dirt to the passage 48. An antifriction thrust bearing construction 51 may be provided in the sump to insure greater ease of motion of the shaft, and suitable packing 52, secured in place by a gland 53, may be provided at the top of the sump to exclude water, dirt, grit and other foreign substances from the bearing surfaces in the sump. In practice the hub 41 may be secured by bolts to the shaft, where the wheel is to be secured for any reason at a fixed point on the shaft above the bottom of the wheel chamber, but, if desired, and as shown, the wheel may be adjustably secured to the shaft, as by the use of disks with hub portions adjustably secured, as by set-screws, to the shaft, and the lower hub disk may be formed to ride in a preferred lowermost position of adjustment of the wheel on the gland 53 or the sump body, to give maximum stability of support to the wheel under certain operating conditions.

The upper portion of the shaft 46 may have an antifriction bearing engagement with the bar or beam 47. As shown in the present instance, the shaft extends upwardly through a bearing cup 54 seated in an opening in and suitably fixed to the bar or beam. In this cup are disposed antifriction bearing balls 55 engaged by an adjustable bearing sleeve 56 having threaded engagement with the shaft, whereby the upper portion of the shaft is journaled for free rotation on the bar or beam. Hand grips 57 on this bearing sleeve adapt it to be conveniently rotated to adjust the shaft to bear properly on the upper and lower set of bearings and to compensate for wear on the bearings. The shaft may project to any desired extent above the bar or beam and be provided with a gear 58, a pulley or any other means for transmitting power from the rotating wheel to any machine or apparatus to be driven. Separate transmission gearing is preferably employed in connection with each wheel shaft so that power from each or any number of them may be transmitted to the same or different machines to be driven. The bar or beam 48 rests adjacent its ends on the flume walls 3, 3' and may be detachably secured to the walls against shifting while in use by means of bolts or other suitable fastenings 59. At the ends of the bar may be provided hand grips 60 by which, on removal of the bolts 59, it may be lifted off the flume and the attached wheel also conveniently lifted out of bearing engagement with the sump whenever it is desired to remove the wheel or replace it with a new one. To relieve the bearing connection between the shaft and bar or beam from strain while a wheel is being lifted out of or lowered into position, suitable supporting or draft connections may be provided. Those shown in the present instance consist of cables or chains 61 attached at one end to the bar or beam and having hooks or the like 62 at their free ends engageable with the wheel spokes to positively connect the bar or beam with the wheel. These cables may be wound up on the bar or beam when not in use to keep them elevated clear of the wheel. In case chains are used in place of the cables, the hooks may be engaged with links of the chain to hold the hooks and chains in an elevated position. In addition, draft eyes 63 or the like may be provided on the bar or beam to adapt it to be engaged with and lifted by a hoisting crane for greater convenience in the handling of a bar or beam and wheel of heavy type. Cover boards or plates of suitable character may in practice be used to close the top of the flume, if desired, and these may be removable so that access may be readily obtained to the flume at any point. The flume may be built as a unit of any one or any combination of the materials specified, or it may be built in sections of suitable form for assemblage to provide a flume of any given length, width and conformation.

In practice, with the gates 16 closed, gates in the partitions 18, 26, 26ᵃ, 26ᵇ, 29, 30 and 37 may be opened to allow water to flow in quantity desired through the raceway without operating the wheels. In operating one or more wheels the gates in the partitions 18, 29, 30 and 31 may be opened as required to supply any given volume of water for use within a given period of time. Assuming that gates in the partitions 18, 29, 30 and 37 are open for flow of a required volume of water, it will be understood that upon opening gates 16, 28ᵃ and 28ᵇ, while keeping gates 16ᵃ, 16ᵇ and 28 closed, water may be supplied to operate the wheel in chamber 5 while the wheels in chambers 5ᵃ and 5ᵇ remain idle. Similarly, by opening gates 16 and 16ᵃ and keeping gates 16ᵇ, 28 and 28ᵃ closed, the wheels in chambers 5 and 5ᵃ may be operated while the wheel in chamber 5ᵇ remains idle and by opening all the gates 16, 16ᵃ, 16ᵇ and keeping gates 28, 28ᵃ, 28ᵇ closed the wheels in all the chambers may be operated and in such manner that the water from one chamber will flow to the following chamber. By opening gate 28, however, while keeping gates 28ᵃ, 28ᵇ closed, an augmented supply of water may be fed to the wheel in chamber 5ᵇ to rotate it faster than the wheels in chambers 5 and 5ᵃ, and by opening gates 28 and 28ᵃ, while keeping gate 28ᵇ closed, an augmented supply of water may be fed to the wheels in the chambers 5ᵃ and 5ᵇ to rotate the wheels therein at higher speed than the wheel in chamber 5 and at the same or different relative speeds. However, by proper adjustment of the gates all the wheels may be made to rotate fast or slow at the same speed or at different relative speeds to supply the same or different amounts of driving power for use. By proper regulation of the gates also water may be bypassed about or diverted from any one or more of the wheel chambers and employed to operate the wheel or wheels in any other chamber or chambers desired. Thus the amount of power which may be supplied to each wheel and the number of wheels operated at a time may be varied to supply any amount of power required and to furnish such power to a single machine or appliance or a number of machines or appliances to be driven.

From the foregoing description, taken in connection with the drawings, the construction and mode of operation of my novel and improved water power system will be readily understood without a further and extended description.

A material advantage resulting from the construction of this system is that it is adapted for use wherever a source of water supply is available and in connection with sources of high, medium or low volume, as its construction allows the flow of water to be controlled to a desired degree and as high power is not necessary to drive any one or simultaneously drive all the wheels at their maximum rate. Another distinct advantage is that the flume may be laid on the ground surface, or partially or wholly embedded in the ground and that an extensive or expensive reservoir for its use is unnecessary. It may also be laid largely independent of or without regard to the topography of the ground, as portions thereof may be elevated where the ground is uneven and it is only necessary to give it a suitable degree of slope where the head pressure is low to secure the required flow of water. Moreover, it is simple in construction and may be built and kept in repair at a comparatively low cost.

While the structure shown for purpose of example is preferred, it is to be understood that changes in the form, construction and arrangement of parts may be made within the scope of the appended claims without departing from the spirit or sacrificing any of the advantages of the invention.

Having thus described my invention, I claim:

1. A water power system comprising a flume having a forebay at one end thereof, a wheel chamber arranged mainly between the longitudinal center and one side of the flume, a water wheel in said chamber, a raceway formed between the wheel chamber and opposite side of the flume, said chamber having an inlet communicating with the forebay and an outlet communicating with the raceway, a gate controlling said inlet, and a gate controlling the outlet between the forebay and raceway.

2. A water power system comprising a flume having a forebay at one end thereof, a plurality of wheel chambers arranged in succession longitudinally of the flume and located mainly between the longitudinal center and one side of the flume, water wheels mounted in said chambers, a raceway formed between said chambers and the opposite side of the flume, each chamber having an outlet opening into the raceway and an inlet, the inlet of the first chamber being arranged to communicate with the forebay and the inlet of each succeeding chamber being arranged to communicate with the raceway and outlet of the preceding chamber, a gate controlling the inlet of each chamber, a partition in the raceway between the inlet and outlet of each chamber and extending across the raceway between the raceway forming side of the flume and the chamber adjacent to the inlet of the latter, each partition having a water passage, and a gate controlling the passage in each partition.

3. A water power system comprising a flume having a forebay at one end thereof, a plurality of wheel chambers arranged in succession longitudinally of the flume and located mainly between the longitudinal center and one side of the flume, water wheels mounted in each chamber, a raceway formed between said chambers and the opposite side of the flume, each wheel chamber being formed of a partly circular wall portion arranged concentric with its axis and having an inlet passage and a wall portion arranged eccentric to its axis and partly separated from the partly circular wall portion to form therewith a flaring outlet passage from the chamber, said outlet passage opening into the raceway, the inlet passage of the first chamber being arranged to communicate with the forebay and the inlet passage of each succeeding chamber being arranged to communicate with the raceway and outlet passage of the preceding chamber, a gate controlling the inlet passage of each chamber, a partition in the raceway between the inlet and outlet passages of each chamber and extending across the raceway between the raceway forming side of the flume and the chamber adjacent to the inlet passage of the latter, each partition having a water passage, and a gate controlling the passage in each partition.

4. A water power system comprising a flume having a forebay at one end thereof, a plurality of wheel chambers arranged in succession and in stepped relation, each lower than the other, longitudinally of the flume and located mainly between the longitudinal center and one side of the flume, water wheels mounted in each chamber, a longitudinally extending raceway formed between said chambers and the opposite side of the flume, each chamber having an outlet opening into the raceway and an inlet, the inlet of the first chamber being arranged to communicate with the forebay and the inlet of each succeeding chamber being arranged to communicate with the raceway and outlet of the preceding chamber, a gate controlling the inlet of each chamber, a partition in the raceway between the inlet and outlet of each chamber and extending across the raceway between the raceway forming side of the flume and the chamber adjacent to the inlet of the latter, each partition having a water passage, and a gate controlling the passage in each partition.

5. A water power system comprising a flume embodying a bottom wall and side walls and having a forebay as one end thereof, partitions in the flume forming a plurality of wheel chambers arranged in succession longitudinally of the flume and located mainly between the longitudinal center and one side of the flume, the bottom of the flume sloping downwardly between its head and tail ends and said bottom, side walls and partitions being arranged to dispose the chambers in stepped relation, each at a lower level than the preceding one, bearing sumps being provided in the bottom wall extending downward from the chambers, water wheels mounted in each chamber, each on an axis journaled in the sump thereof, a raceway formed between said chambers and the opposite side of the flume, each chamber having an outlet opening into the raceway and an inlet, the inlet of the first chamber being arranged to communicate with the forebay and the inlet of each succeeding chamber being arranged to communicate with the raceway and outlet of the preceding chamber, a gate controlling the inlet of each chamber, a partition in the raceway between the inlet and outlet of each chamber and extending across the raceway between the raceway forming side of the flume and the chamber adjacent to the inlet of the latter, each partition having a water passage, and a gate controlling the passage in each partition.

6. A water power system comprising a flume having a forebay at one end thereof and a bottom bearing sump having an end thrust bearing, a wheel chamber arranged mainly between the longitudinal center and one side of the flume, a shaft extending vertically in said chamber and journaled at its lower end in said sump, a raceway formed between the wheel chamber and opposite side of the flume, said chamber having an inlet for the admission of water thereinto supplied from the forebay and having an outlet communicating with the raceway, gates respectively controlling said inlet and outlet, a wheel mounted on the shaft within the wheel chamber, a support for the upper end of the shaft mounted on the flume and through which said end of the shaft extends, and bearing means between the shaft and support embodying means whereby the shaft may be adjusted with relation to the end thrust bearing in the bearing sump.

7. A water power system comprising a flume having a forebay at one end thereof and a bottom bearing sump having an end thrust bearing, a wheel chamber arranged mainly between the longitudinal center and one side of the flume, a shaft extending vertically in said chamber and removably journaled at its lower end in said sump, a raceway formed between the wheel chamber and opposite side of the flume, said chamber having an inlet for the admission of water thereinto supplied from the forebay and having an outlet communicating with the raceway, gates respectively controlling said inlet and outlet, a wheel mounted on the shaft within the wheel chamber, a support for the upper end of the shaft mounted on the flume and through which said end of the shaft extends, bearing means between the shaft and support embodying means whereby the shaft may be adjusted with relation to the end thrust bearing in the bearing sump, and means for connecting the wheel with the support to adapt the wheel and shaft to be raised by the support and the wheel withdrawn from the bearing sump.

JOHN Y. ROBERTSON.